United States Patent
Regnier et al.

(10) Patent No.: US 6,647,423 B2
(45) Date of Patent: Nov. 11, 2003

(54) DIRECT MESSAGE TRANSFER BETWEEN DISTRIBUTED PROCESSES

(75) Inventors: Gregory J. Regnier, Portland, OR (US); David S. Dunning, Portland, OR (US); Donald F. Cameron, Portland, OR (US); Gary L. McAlpine, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 167 days.

(21) Appl. No.: 09/097,757

(22) Filed: Jun. 16, 1998

(65) Prior Publication Data

US 2002/0062402 A1 May 23, 2002

(51) Int. Cl.[7] ............................................. G06F 15/16
(52) U.S. Cl. ...................................... 709/229; 709/313
(58) Field of Search ................................. 709/100, 200, 709/310, 216, 313, 250, 319, 229, 213, 312; 711/164, 207, 206, 202, 203; 710/1; 703/23

(56) References Cited

U.S. PATENT DOCUMENTS

| | | | | |
|---|---|---|---|---|
| 4,135,240 A | * | 1/1979 | Ritchie | ...................... 711/164 |
| 4,400,778 A | * | 8/1983 | Vivian et al. | ................... 710/1 |
| 4,733,350 A | * | 3/1988 | Tone et al. | ................... 711/207 |
| 5,386,524 A | * | 1/1995 | Lary et al. | ................... 711/206 |
| 5,598,553 A | * | 1/1997 | Richter et al. | ................. 703/23 |
| 5,805,920 A | * | 9/1998 | Sprenkle et al. | ............ 395/821 |
| 5,991,797 A | * | 11/1999 | Futral et al. | ................ 709/216 |
| 6,163,834 A | * | 12/2000 | Garcia et al. | ............... 711/206 |

OTHER PUBLICATIONS

Compaq Computer Corp., Intel Corporation, Microsoft Corporation; "Virtual Interface Architecture Specification", Version 1.0 (1997); pp. 1–83.

* cited by examiner

Primary Examiner—John Follansbee
Assistant Examiner—V. H. Nguyen
(74) Attorney, Agent, or Firm—Trop, Pruner & Hu, P.C.

(57) ABSTRACT

An interprocess communication technique transfers a message from a first process' memory (on a first computer system) directly to a second process' memory (on a second computer system). The message is identified by a virtual address and possibly a memory handle. The message is not stored in intermediary memory, such as operating system buffer memory, during the transfer. The communication technique may also provide virtual to physical address translation and memory protection. Memory protection is provided by ensuring that the communicating processes own the memory (the contents of which includes the message) being transferred between them.

20 Claims, 8 Drawing Sheets

DIRECT MESSAGE TRANSFER BETWEEN DISTRIBUTED PROCESSES

A portion of this document contains material which is subject to copyright protection. The copyright owner has no objection to the facsimile reproduction by any one of this document, as it appears in the Patent and Trademark Office patent files or records, but otherwise reserves all copyright rights whatsoever.

BACKGROUND

The invention relates generally to a memory protection scheme for use in a distributed computer system.

In many prior network architectures, the operating system (OS) virtualizes network hardware into a set of logical communication endpoints and multiplexes access to the hardware among these endpoints. The operating system may also implement protocols that make communication between connected endpoints reliable (e.g., transmission control protocol, TCP). While this model permits a simple hardware-to-operating system interface, all communication operations require a call or trap into the operating system kernel. This can be an expensive operation in terms of time and computational resources.

By way of example, consider the message passing method outlined in FIG. 1. First, the OS receives a request to send a message (data) and a virtual address that specifies the location of the data associated with the message (step 100). The OS copies the message into a message buffer (step 102) and translates the virtual address (step 104). The OS then notifies a device, such as a direct memory access (DMA) controller, that a memory move operation is needed (step 106). The DMA controller completes message delivery by copying the data from the OS's buffer memory to the target device's memory (step 108).

This approach to interprocess communication generally requires that memory pages used to store messages be locked down and that their virtual addresses be translated into physical addresses before a network adapter can access them (e.g., for transfer to/from a remote process). When the transfer is complete, the pages are unlocked. Traditional network transport techniques perform these steps on every data transfer request, contributing significantly to the overhead associated with data transfer operations. It would be beneficial to provide a method that is more efficient than these prior methods while also providing mechanisms to ensure that process memory is protected during data transfer operations.

SUMMARY

In one embodiment the invention provides an interprocess communication technique that transfers a message from a first process' memory (on a first computer system) directly to a second process' memory (on a second computer system). The message need not be stored in intermediary memory, such as operating system buffer memory, during the transfer. The communication technique may also provide virtual to physical address translation and memory protection.

In another embodiment, the invention provides a translation and protection table (TPT) for use by a virtual interface architecture network interface controller. The TPT is used to translate virtual addresses to physical address and also to provide memory protection tags to enforce memory protection.

Methods in accordance with the invention may be stored in any media that is readable and executable by a computer system.

DETAILED DESCRIPTION

One goal of a new interface technology, the virtual interface (VI) architecture, is to improve the performance of distributed applications by reducing the latency associated with critical message passing operations. (See the "Virtual Interface Architecture Specification," ver. 1.0, Dec. 16, 1997.) One technique for achieving this goal while also providing protection for memory used to transfer data (messages) is described herein. The following embodiment, described in terms of a cache architecture, is illustrative of this concept only and is not to be considered limiting in any respect.

Figure 1:
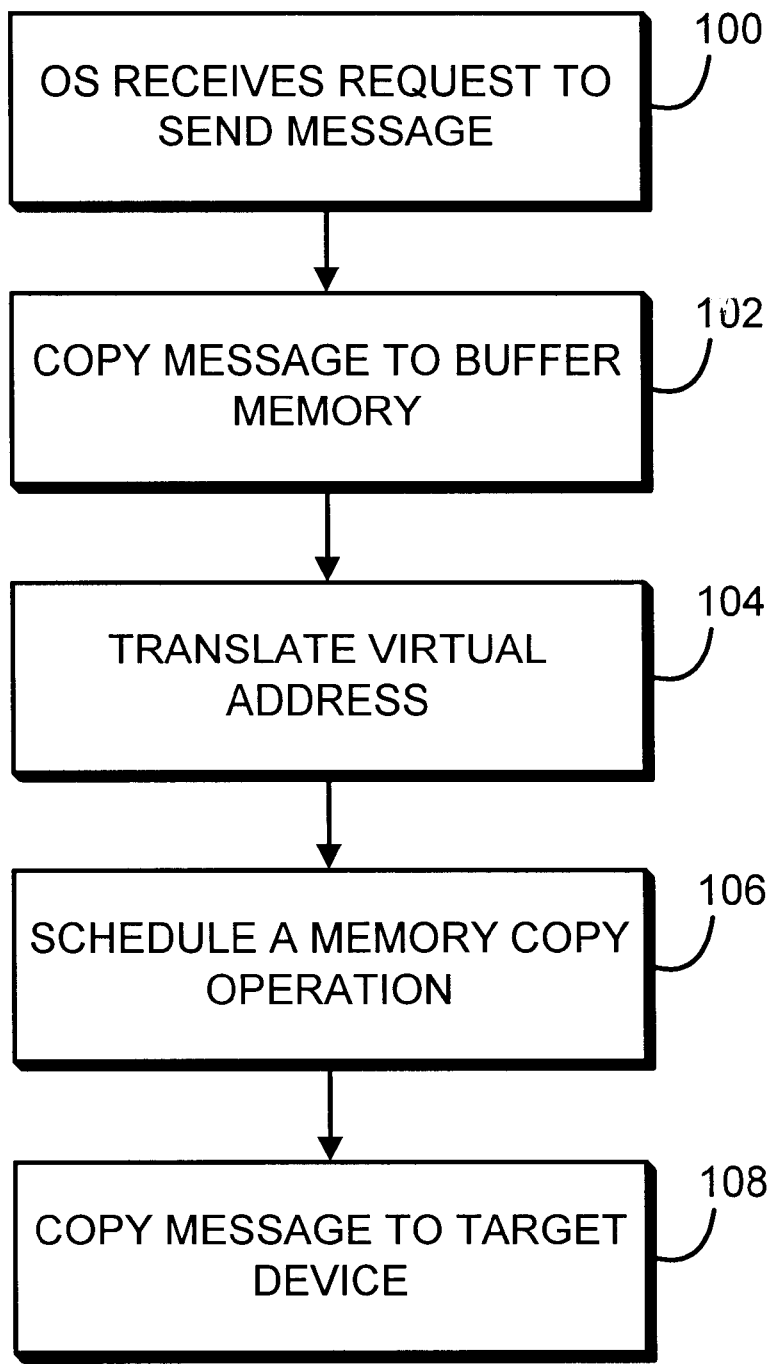
FIG. 1 shows an illustrative conventional message passing process.
Figure 2:
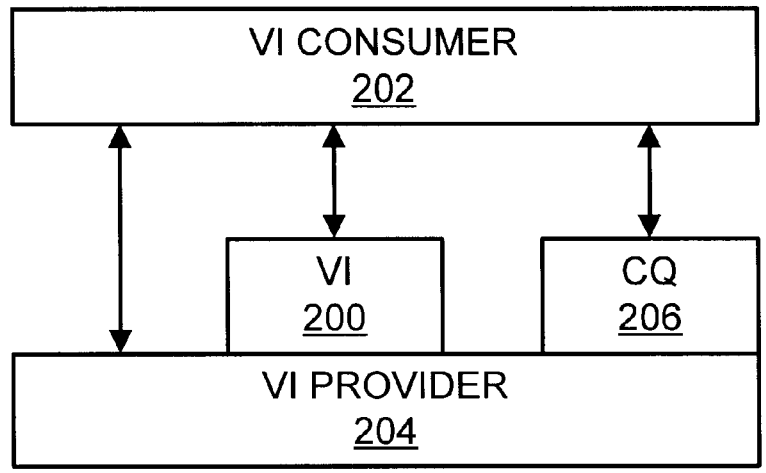
FIG. 2 shows the components of a virtual interface (VI) architecture.
Figure 3:
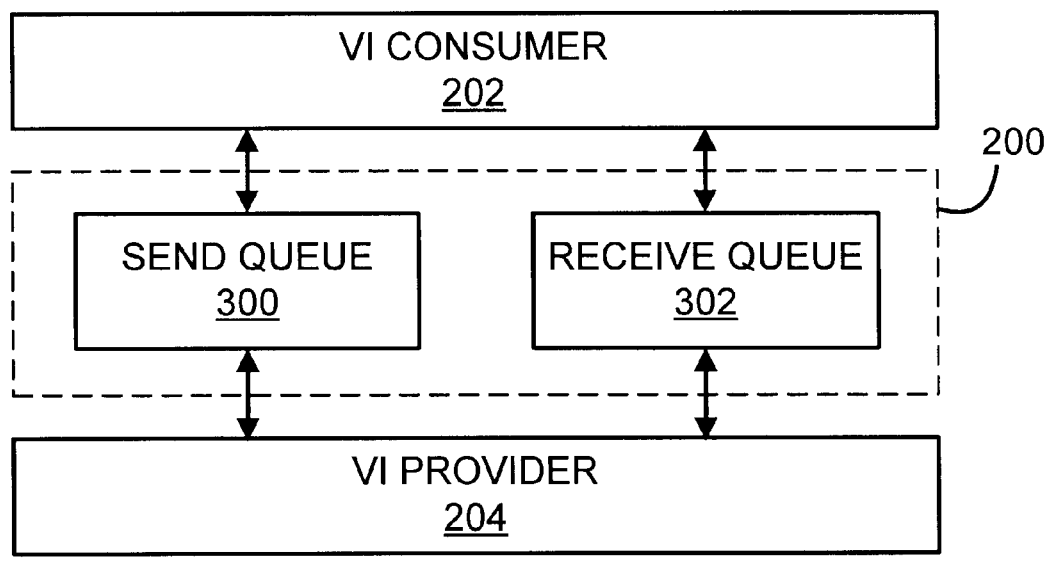
FIG. 3 shows an illustrative virtual interface.

Referring to FIG. 2, the VI architecture comprises four basic components: virtual interface (VI) 200; VI consumer 202; VI provider 204; and completion queue (CQ) 206. A VI is the mechanism that allows VI consumer 202 to directly access VI provider 204. Each VI represents a communication endpoint, and endpoint pairs may be logically connected to support bi-directional, point-to-point data transfer. Referring now to FIG. 3, VI 200 consists of a pair of work queues; send queue 300 and receive queue 302. VI consumer 202 posts requests, in the form of descriptors, onto either the send queue 300 or the receive queue 302, and removes completed descriptors from either the send 300 or receive queues 302. A descriptor is a memory structure that contains the information VI provider 204 needs to process a request from VI consumer 202, such as pointers to data buffers (see discussion below). VI provider 204 asynchronously processes posted descriptors and marks them with a status value when completed. Each work queue has an associated doorbell that is used to notify the VI network adapter (an element of VI provider 204) that a new descriptor has been posted to a work queue. Doorbells are directly implemented by the adapter and require no operating system (OS) intervention to operate.

VI consumer 202 represents the user of VI 200. While an application program is the ultimate consumer of computer network communication services, applications access these services through standard programming interfaces such as sockets or a message passing interface (MPI). Generally implemented as libraries, these facilities (loaded into application processes) are responsible for making the necessary system calls to VI provider 204 to create a VI on a local computer system and to connect it to a VI on a remote computer system. Once a connection is established, the interface library posts the application's send and receive requests directly to the local VI. (The data transfer mechanism is discussed below.)

Figure 4:
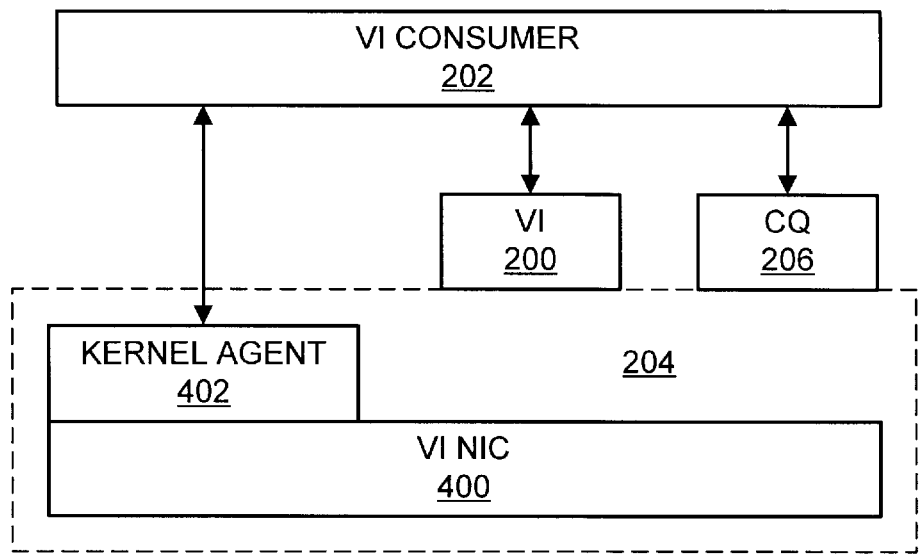
FIG. 4 shows a VI provider in accordance with one embodiment of the invention.

VI provider 204 is the set of hardware and software components responsible for instantiating VI 200. Referring to FIG. 4, VI provider 204 may include a network interface controller (NIC) 400 and kernel agent 402. VI NIC 400 implements VI 200 and CQ 206 and directly performs data transfer functions. Kernel agent 402 is a privileged part of the OS, usually a driver supplied by the VI NIC vendor, that performs the setup and resource management functions needed to maintain a virtual interface between VI consumer 202 and VI NIC 400. These functions typically include the creation/destruction of VIs, VI connection setup/teardown, interrupt management and/or processing, management of system memory used by VI NIC 400, and error handling. VI consumer 202 may access kernel agent 402 using standard OS mechanisms such as system calls. Kernel agent 402 interacts with VI NIC 400 through standard operating system device management mechanisms. Under the VI architecture, VI NIC (or network adapter) 400 performs endpoint virtualization directly and subsumes the tasks of multiplexing, demultiplexing, and data transfer scheduling normally performed by OS kernel software and device driver.

Notification of completed requests (message/data transfer operations) can be directed to completion queue on a per-VI work queue basis. (This association may be established when a VI is created.) That is, CQ 206 allows VI consumer 202 to coalesce notification of descriptor completions from multiple VIs in a single location. As with VI work queues (see FIG. 3), notification status can be placed into CQ 206 by VI NIC 400 without an interrupt, and VI consumer 202 can synchronize on a completion without a kernel transition.

Figure 5:
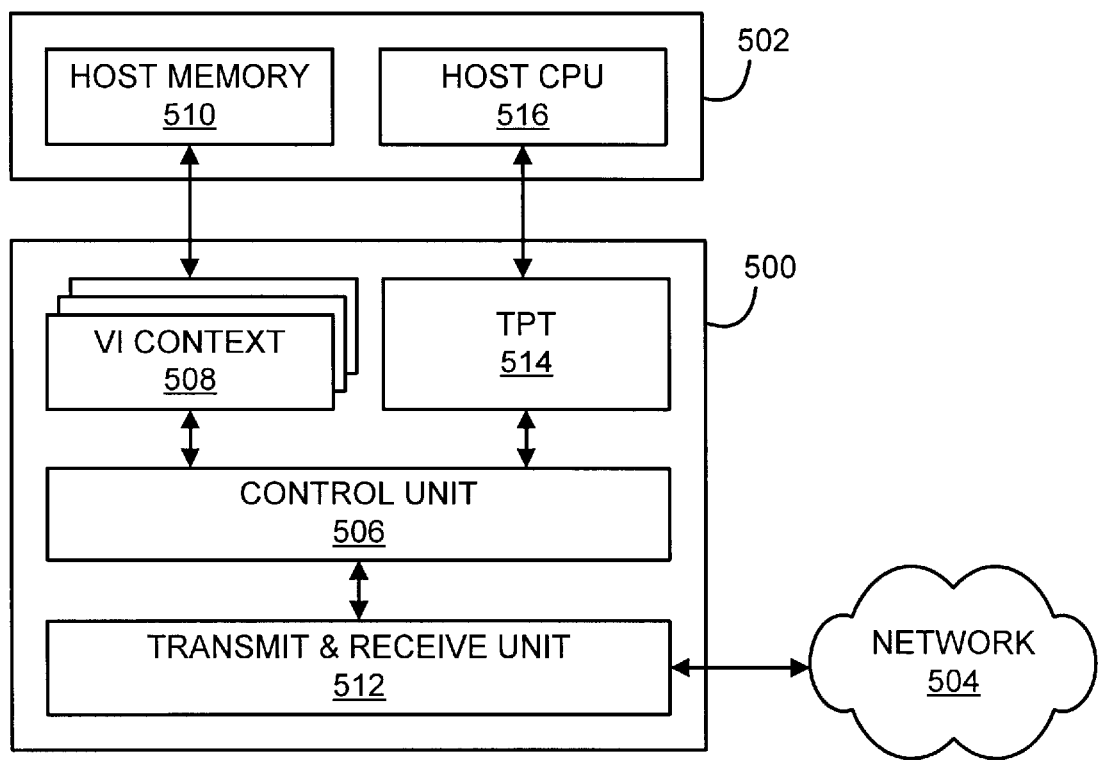
FIG. 5 shows an illustrative VI network interface controller.

Referring to FIG. 5, VI NIC 500 may be used to achieve memory safe low is latency message passing between host computer system 502 and computer network 504. Conceptually, VI NIC 500 virtualizes host-to-network hardware interfaces and associates each with a VI. When control unit 506 executes a time slice for a given VI, it uses the VI's corresponding context 508 to control its behavior, multiplexing data (messages) to/or from host memory 510 to/or from 20 network 504 via transmit and receive unit 512. Control unit 506 also manages the network side of VI queues (see FIG. 3) and may directly access queues and buffers in host memory 510 through remote direct memory access (RDMA) transactions, e.g., read and write operations.

Translation and protection table (TPT) 514 is used to translate virtual 25 address, received in the form of descriptors, into physical addresses while simultaneously verifying that the owner of the associated VI also owns the physical memory addressed. Requiring the VI owner to also own the accessed memory ensures that processes do not access memory outside their process boundaries.

In terms of message passing (the transfer of data between processes), the VI architecture only requires that memory used for interprocess data transfer be registered with a VI provider, and that a VI consumer identify memory used for a data transfer prior to submitting a transfer request. Identification of message memory is accomplished through a memory registration operation. Memory registration allows a VI consumer to reuse registered memory buffers, thereby avoiding duplication of locking and translation operations associated with prior messaging techniques. Memory registration may also enable a VI provider to transfer data directly between the buffers of a VI consumer and the network without copying data to or from intermediate buffers (e.g., operating system buffer memory). This too may provide improved performance over prior network transport techniques which often copy data between user buffers and intermediate kernel buffers.

Figure 6:
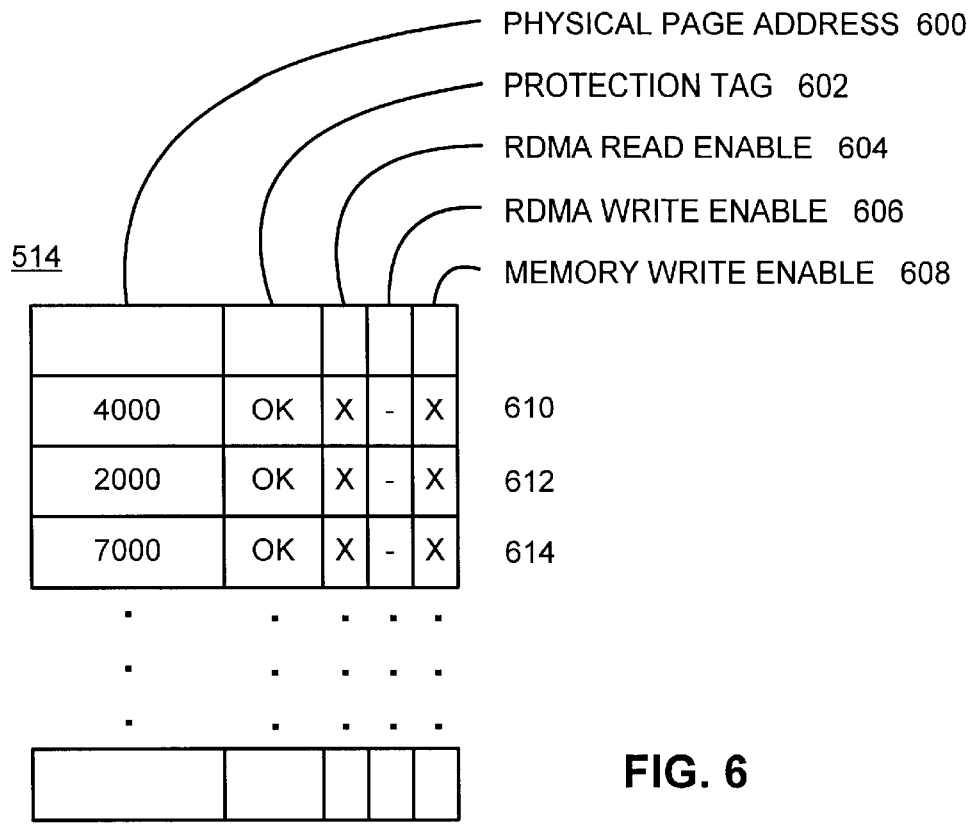
FIG. 6 shows an illustrative translation and protection cache.

Referring now to FIG. 6, each TPT 514 entry includes a physical page address field 600, a protection tag field 602, and a series of memory access attributes: RDMA read enable flag 604; RDMA write enable flag 606; and memory write enable flag 608. While a VI consumer is allowed to specify arbitrary alignment and lengths of memory regions to be registered, the translation and memory attributes of the region are applied to each complete page within that memory region.

One function of the memory registration process is to define one or more virtually contiguous physical pages as a memory region. Each memory region is associated with a contiguous set of entries in TPT 514. There is one TPT 514 entry for each registered memory page. During memory registration, VI kernel agent 402 initializes each newly allocated TPT 514 entry with the corresponding physical page address 600, protection tag 602, and the memory access attributes (604, 606, and 608) of the registering process. Memory registration may also return an opaque memory handle to the registering process that, in combination with a virtual address to any location within the registered memory region, uniquely identifies a TPT 514 entry (see discussion below). If NIC 500 (kernel agent) is unable to find sufficient contiguous TPT entries to register a memory region, the registration process fails. When a memory region is registered, every page within the region is locked down in physical memory. This guarantees to VI NIC 500 that the memory region is physically resident (not paged out) and that the virtual to physical translation remains fixed. Memory registration is a process level action. That is, memory registered by a thread within a process may be accessed by any thread within that process.

Memory protection tags are unique identifiers (within a VI provider) that are associated both with VIs and with memory regions. VI providers create and destroy memory protection tags on behalf of VI consumers. If a memory region's access attributes are changed, the associated protection tag may be replaced. A memory access is allowed by VI NIC 500 if the memory protection tag of the VI and of the memory region involved are identical. Attempted accesses that violate this rule may result in a memory protection error and no data is transferred. If the protection tag of the process that registered a memory region is stored in its VI context memory 508 (or any other memory accessible by NIC 500), this check can easily be made at virtual memory address translation time. If a VI consumer is not concerned with memory protection, it can use the same memory protection tag for all VIs and all memory regions.

Memory access attributes 604, 606, and 608 may be used to control read and write access to a given memory region. These permissions are generally set for memory regions and VIs when they are created, but may be modified later by changing the attributes of the memory region, and/or of the VI. If memory access attributes between a VI and a memory region do not match (during an attempted access), the attribute offering the most protection will be honored. For instance, if a VI has RDMA read enabled, but the memory region does not, the result is that RDMA reads on that VI from that memory region will fail. RDMA read and write access attributes (604 and 606) are enforced at the remote end of a connection that is referred to by the descriptor. The memory write enable 608 access attribute is enforce for all memory access to the associated page. An attempted message transfer operation that violates a memory region's permission settings may result in a memory protection error and no data is transferred. Referring again to FIG. 6, when a VI consumer registers three pages of memory, three consecutive entries (610, 612, and 614) in TPT 514 are allocated. Each entry has the page's corresponding physical address (e.g., 4000, 2000, and 7000), the registering process' protection tag (OK) and memory access authority ('X' indicates an attribute is set, and '-' indicates the attribute is not set).

As mentioned above, data (message) transfer requests are represented by descriptors. There are two general types of descriptors, send/receive and read/write (RDMA). Programmatically, descriptors are data structures organized as a list of segments. Descriptors begin with a control segment followed by an optional address segment and an arbitrary number of data segments. Control segments contain control and status information. Address segments, for read/write operations, contain remote buffer information (i.e., memory associated with the VI targeted to receive the read/write request). Data segments, for both send/receive and read/write operations, contain information about the local memory (i.e., memory associated with the VI issuing the send/receive or read/write request).

Figure 7A:
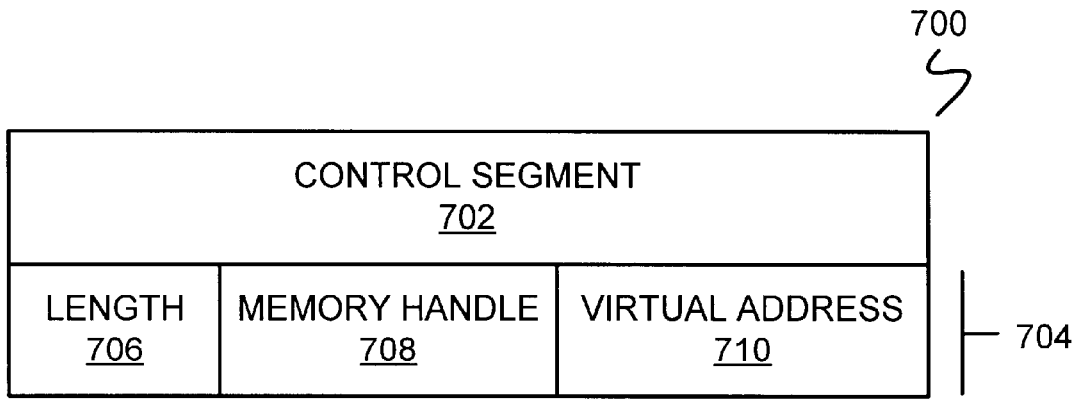
FIGS. 7A and 7B show illustrative VI architecture descriptors.

Referring to FIG. 7A, an illustrative send/receive type descriptor 700 is shown as having a control segment 702 and a data segment 704. Data segment 704, in turn, has a segment length field 706, a memory handle field 708, and a virtual address field 710. Segment length 706 specifies the length of the message to be sent or that is to be received. Memory handle 708 is used to verify that the sending/requesting process (i.e., VI) owns the registered memory region indicated by segment length 704 and virtual address 710 (see discussion below). For a send operation, virtual address 710 identifies the starting memory location of the message (data) to be sent in the sending VI's local memory space. For a receive operation, virtual address 710 identifies the starting memory location of where the received message (data) is to be stored in the requesting VI's local memory space.

Figure 7B:
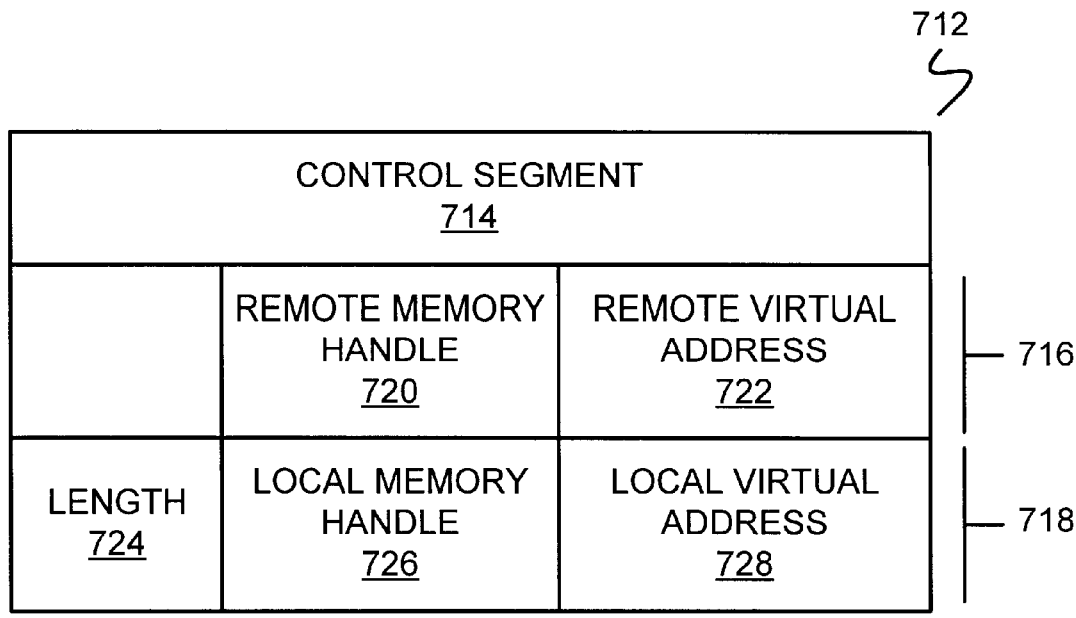

Referring to FIG. 7B, an illustrative read/write type descriptor 712 is shown as having a control segment 714, an address segment 716, and a data segment 718. Address segment 716 has a remote memory handle field 720 and a remote virtual address field 722. Data segment 718 has a segment length field 724, a local memory handle field 726, and a local virtual address field 728. For a read operation, remote virtual address 722 identifies the memory location in the remote process' memory space, of the message (data) to be read. Local virtual address 728 identifies the starting memory location in the local process' memory space of where the received message is to be placed. The amount of memory to be used to store the message is specified by segment length field 724. For a write operation, remote virtual address 722 identifies the memory location in the local process' memory space of the message (data) to be written. Local virtual address 728 identifies the starting memory location in the local process' memory space of where the message being written is stored. The size of the message is specified by segment length field 724. Remote memory handle 720 is that memory handle associated with the memory identified by remote virtual address 722. Local memory handle 726 is that memory handle associated with the memory identified by local virtual address 728.

Figure 8:
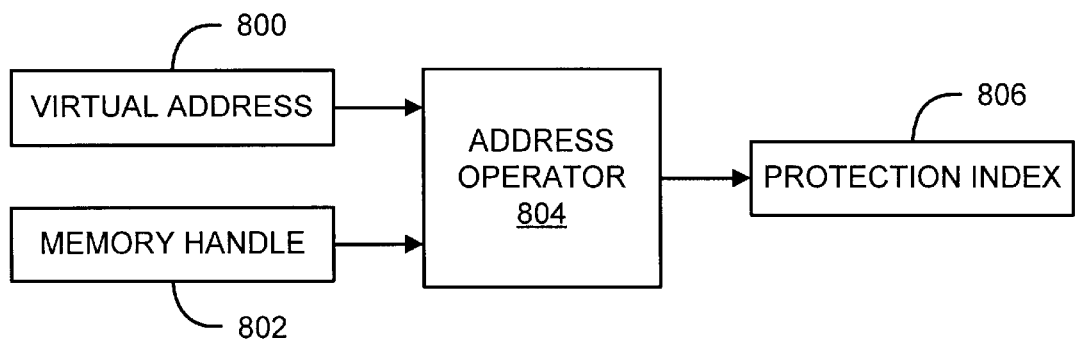
FIG. 8 shows a virtual address translation mechanism in accordance with one embodiment of the invention.
Figure 9:
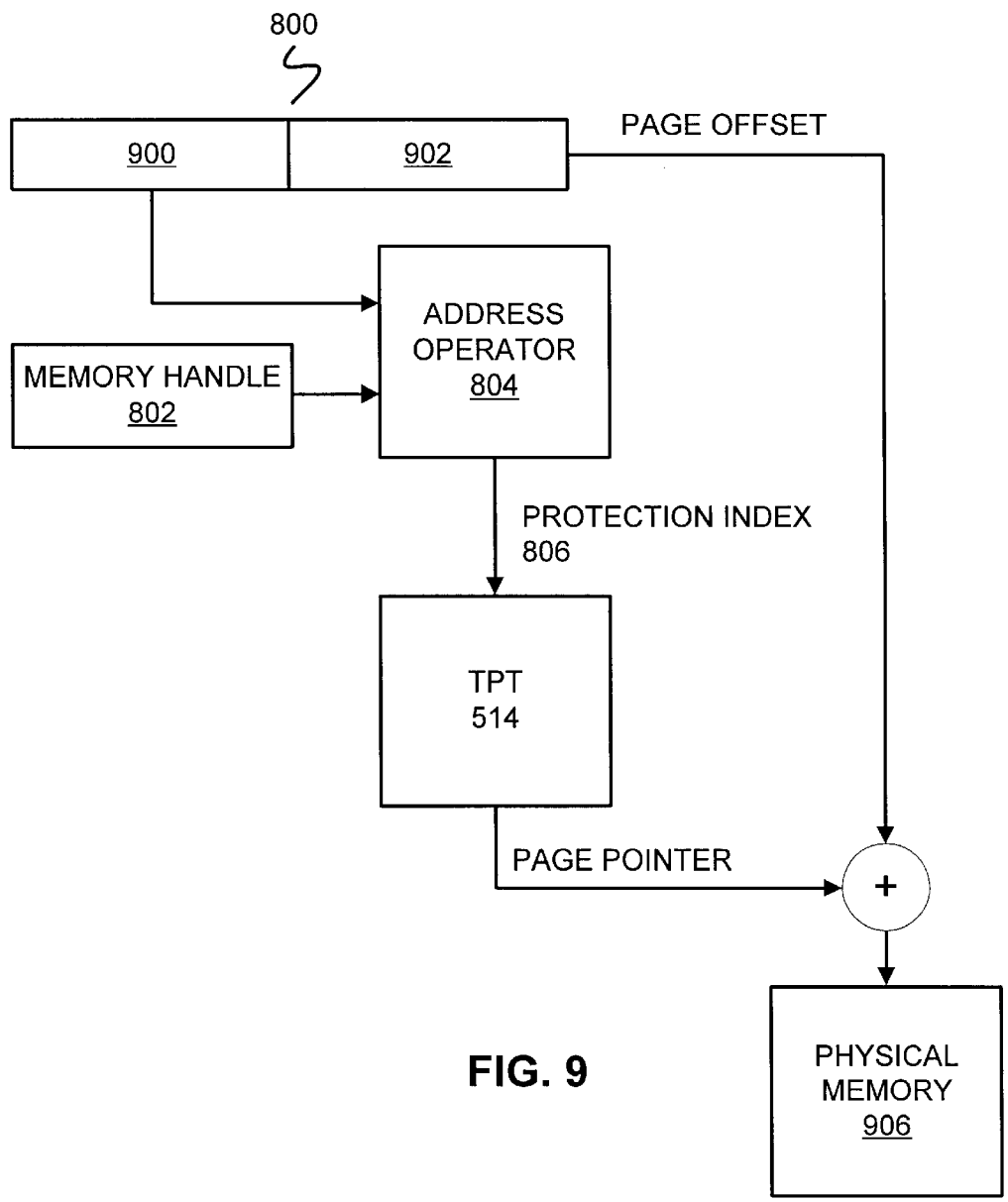
FIG. 9 shows an illustrative virtual memory translation scheme.

Referring now to FIG. 8, when a VI NIC processes a descriptor it uses virtual address 800 and the associated memory handle 802 to generate a protection index 806 via address operator 804. Protection index 806 is an index into TPT 514. From the identified TPT entry, the physical address associated with virtual address 800 may be obtained. In send and receive operations, virtual address 800 and memory handle 802 correspond to memory handle field 708 and virtual address field 710 of FIG. 7A. In read and write operations, virtual address 800 and memory handle 802 correspond to remote memory handle 720 and remote virtual address field 722 on the remote VI NIC, and local memory handle field 726 and local virtual address field 728 on the local VI NIC of FIG. 7B. As a practical matter, virtual address 800 may be divided into two parts as shown in FIG. 9. A first portion 900 is combined with memory handle 802 to generate protection index 806 through address operator 804. A second portion 902 provides a page offset and, when combined with a retrieved page pointer, uniquely identifies a single location in physical memory 906. In one embodiment, address operator 804 is the subtraction operation. Thus, during memory registration, memory handle 802 must be generated so that when subtracted from a virtual address contained within the registered (contiguous) memory region, the correct TPT entry is indexed. It is significant to note that the described mechanism allows memory address translation across arbitrary physical page crossings within a memory region as long as the pages of the memory region are contiguous in virtual address space, i.e., are virtually contiguous.

Figure 10:
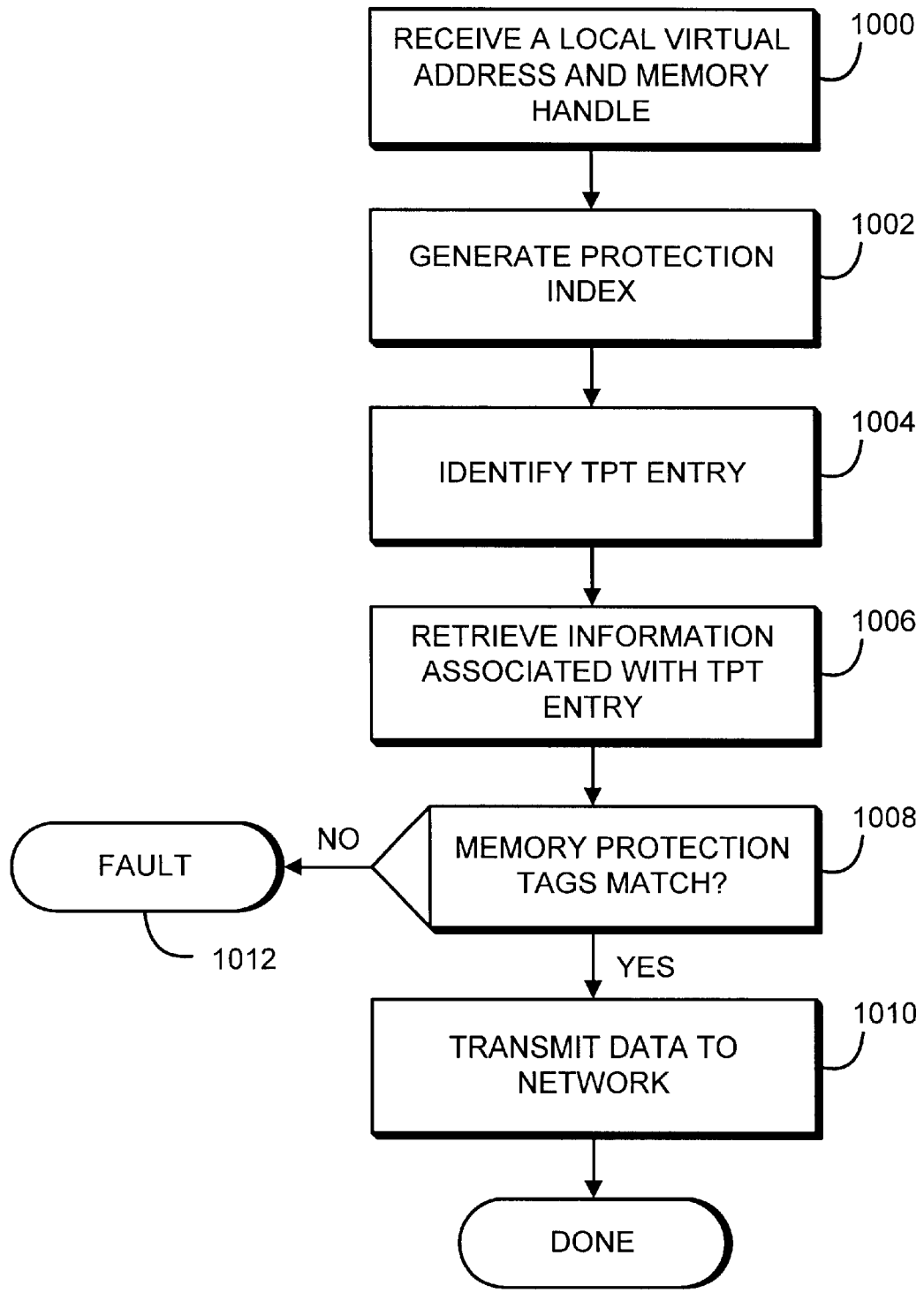
FIG. 10 shows a send processing technique in accordance with one embodiment of the invention.

A VI NIC can process a send descriptor as shown in FIG. 10. In step 1000, the NIC retrieves the message's starting virtual address 710 (in the local, or sending process' memory space), and a memory handle 708 associated with the message's memory region. Virtual address 710 and memory handle 708 are operated on as shown in FIG. 8 to generate a protection index (step 1002). The protection index is used to identify and retrieve information stored in a TPT entry (steps 1004 and 1006). If the retrieved protection tag matches the protection tag associated with the local (sending) process (the 'yes' prong of step 1008), the NIC sends the message toward the destination (remote) process by transmitting it (the message or data) to the network (see FIG. 5). If the retrieved protection tag and the sending process' protection tag do not match (the 'no' prong of step 1008), a memory protection fault may be generated (step 1012) and no data is transferred. Receive descriptors are processed in an analogous fashion.

Figure 11:
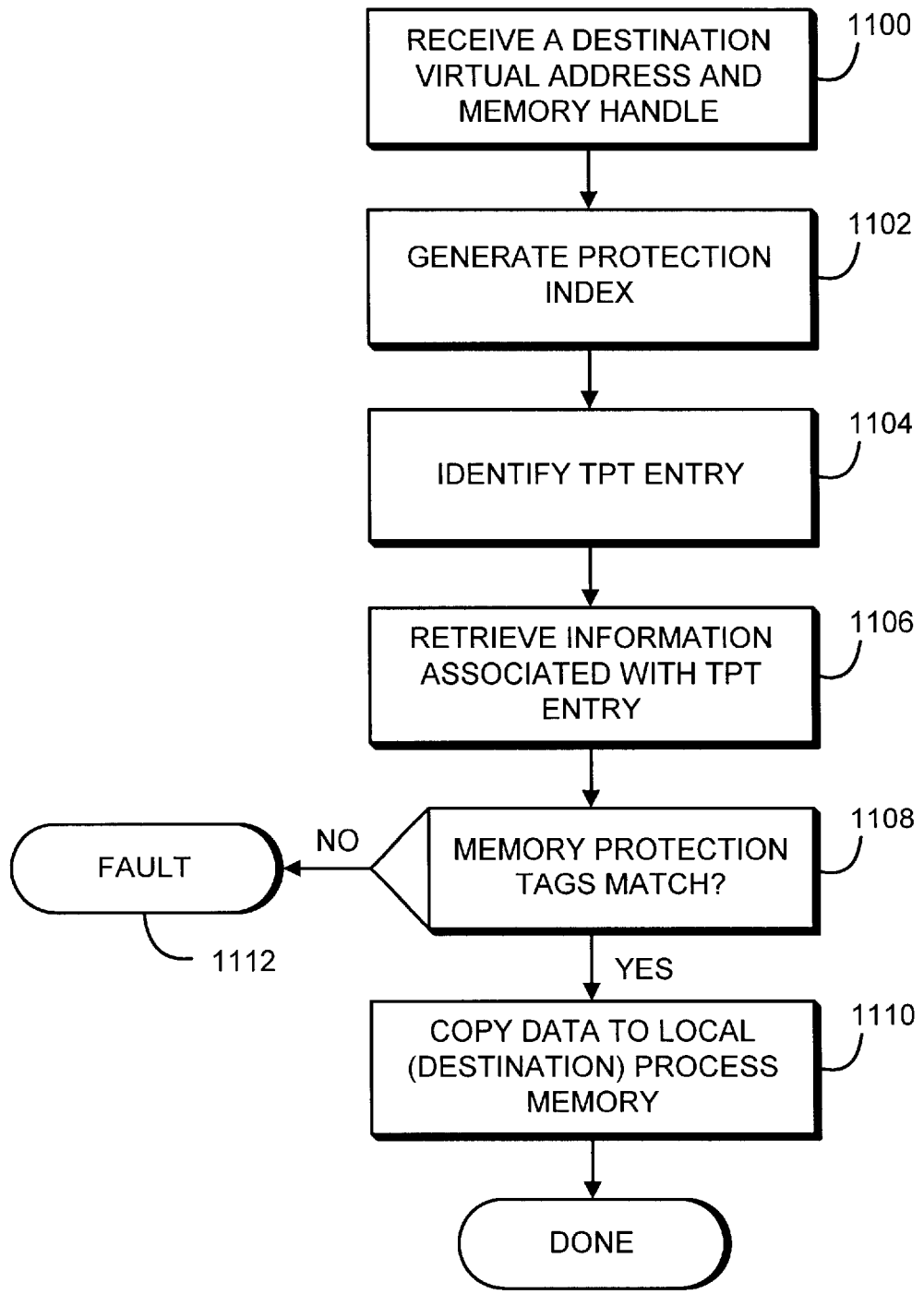
FIG. 11 shows an illustrative write process technique.

A VI NIC can process a read descriptor as shown in FIG. 11. In step 1100, the NIC retrieves the message's destination virtual address 728 (in the local, or receiving process' memory space), a memory handle 726 associated with the message's destination memory region, and indication of how long the incoming message is 724. The virtual address 728 and memory handle 726 are operated on to generate a protection index (step 1102). The protection index is used to identify and retrieve a information stored in a TPT entry (steps 1104 and 1106). If the retrieved protection tag matches the protection tag associated with the local (receiving) process (the 'yes' prong of step 1108), the NIC copies the message into the local process' memory. If the retrieved protection tag and the receiving process' protection tag do not match (the 'no' prong of step 1108), a memory protection fault is generated (step 1112) and no data is transferred. Write descriptors are processed in an analogous fashion.

Various changes in the materials, components, circuit elements, as well as in the details of the illustrated operational methods are possible without departing from the scope of the claims. For example, TPT 514 could be implemented in VI NIC 500 or in another location such as host processor 502. A location within the NIC can provide fast, non-contentious access memory access to VI context and other memory required to pass messages. Also, process (i.e., VI) memory protection flags can be stored in any memory accessible to VI NIC 500 (i.e., the NIC's kernel agent). Further, address operator 804 does not have to be a subtraction operator. It is only important that the memory registration and memory translation procedures use a common operator, and that the operator return a unique protection index. In addition, method steps of FIGS. 10 and 11 may be performed by a computer processor executing instructions organized into a program module or a custom designed state machine. Storage devices suitable for tangibly embodying computer program instructions include all forms of nonvolatile memory including, but not limited to: semiconductor memory devices such as EPROM, EEPROM, and flash devices; magnetic disks (fixed, floppy, and removable); other magnetic media such as tape; and optical media such as CD-ROM disks.

What is claimed is:

1. A method for sending a message between two processes comprising:

receiving a descriptor having a virtual address associated with the message and a memory handle associated with a first process executing on a first computer system;

retrieving a physical address and a protection tag using the virtual address and memory handle; and sending, through a network interface controller, the message, located at a location specified by the physical address, to a second process executing on a second computer system without storing the message in an intermediary memory if the retrieved protection tag matches a protection tag associated with the first process alter a single data transfer initialization occurs for the first process in order to respond to different data transfer requests therefrom.

2. The method of claim 1, wherein the memory handle is a virtual interface architecture memory handle.

3. The method of claim 1, wherein retrieving comprises:

forming an index from the virtual address and the memory handle; and obtaining the physical address and protection tag using the index.

4. The method of claim 3, wherein forming comprises subtracting the memory handle from the virtual address.

5. The method of claim 1, wherein the descriptor is a virtual interface architecture send type descriptor.

6. A method for transferring a message between two processes comprising:

receiving a message descriptor having a virtual address associated with the message and a memory handle associated with a first process executing on a first computer system;

retrieving a physical address and a protection tag using the virtual address and the memory handle; and transferring, through a network interface controller, the message to a location specified by the physical address and associated with a second process executing on a second computer system, without storing the message in an intermediary memory, if the retrieved protection tag matches a protection tag associated with the second process after a single data transfer initialization occurs for the first process in order to respond to different data transfer requests therefrom.

7. The method of claim 6, wherein the memory handle is a virtual interface architecture memory handle.

8. The method of claim 6, wherein retrieving comprises:

forming an index from the virtual address and the memory handle; and obtaining the physical address and protection tag using the index.

9. The method of claim 8, wherein forming comprises:

subtracting the memory handle from the virtual address.

10. The method of claim 6, wherein the descriptor is a virtual interface architecture receive type descriptor.

11. A method for reading a message between two processes comprising:

receiving a message descriptor having a first virtual address associated with the message and a first memory handle associated with a first process executing on a first computer system, and a second memory handle and a second virtual address associated with a second process executing on a second computer system;

retrieving a physical address and a protection tag using the second virtual address and the second memory handle; and transferring, through a network interface controller, the message to a location specified by the physical address, without storing the message in an intermediary memory, if the retrieved protection tag matches a protection tag associated with the second process after a single data transfer initialization occurs for the first process in order to respond to different data transfer requests therefrom.

12. The method of claim 11, wherein the memory handle is a virtual interface architecture memory handle.

13. The method of claim 11, wherein retrieving comprises:

forming an index from the virtual address and the memory handle; and obtaining the physical address and protection tag using the index.

14. The method of claim 13, wherein forming comprises subtracting the memory handle from the virtual address.

15. The method of claim 11, wherein the descriptor is a virtual interface architecture read type descriptor.

16. A method for writing a message between two processes comprising:

receiving a message descriptor having a first virtual address and a first memory handle associated with a first process executing on a first computer system, and a second virtual address associated with the message and a second memory handle associated with a second process executing on a second computer system;

retrieving a physical address and a protection tag using the first virtual address and the first memory handle; and transferring, through a network interface controller, the message to a location specified by the physical address, without storing the message in an intermediary memory, if the retrieved protection tag matches a protection tag associated with the first process after a single data transfer initialization occurs for the first process in order to respond to different data transfer requests therefrom.

17. The method of claim 16, wherein the memory handle is a virtual interface architecture memory handle.

18. The method of claim 16, wherein retrieving comprises:

forming an index from the virtual address and the memory handle; and obtaining the physical address and protection tag using the index.

19. The method of claim 18, wherein forming comprises:

subtracting the memory handle from the virtual address.

20. The method of claim 16, wherein the descriptor is a virtual interface architecture write type descriptor.

* * * * *